US006912177B2

(12) United States Patent
Smith

(10) Patent No.: US 6,912,177 B2
(45) Date of Patent: Jun. 28, 2005

(54) TRANSMISSION OF DATA IN BOREHOLES

(75) Inventor: David Balfour Smith, Stonehaven (GB)

(73) Assignee: Metrol Technology Limited, Aberdeen (GB)

( * ) Notice: Subject to any disclaimer, the term of this patent is extended or adjusted under 35 U.S.C. 154(b) by 0 days.

(21) Appl. No.: 08/976,440

(22) Filed: Nov. 25, 1997

(65) Prior Publication Data

US 2003/0072218 A1 Apr. 17, 2003

Related U.S. Application Data

(63) Continuation of application No. 08/813,104, filed on Mar. 7, 1997, now abandoned, which is a continuation of application No. 08/687,907, filed on Jul. 30, 1996, now abandoned, which is a continuation of application No. 08/544,666, filed on Oct. 18, 1995, now abandoned, which is a continuation of application No. 08/030,309, filed on May 7, 1993, now abandoned.

(30) Foreign Application Priority Data

Sep. 29, 1990 (GB) ............................................ 9021253

(51) Int. Cl.[7] ............................ H04H 9/00; G01V 1/40

(52) U.S. Cl. ........................ 367/82; 367/81; 340/853.1; 340/854.4; 175/40

(58) Field of Search .............................. 367/81, 82, 83, 367/25, 35; 340/853.1, 854.4, 853.3, 853.7, 853.9, 854.8; 175/40, 48; 181/102

(56) References Cited

U.S. PATENT DOCUMENTS 3,790,930 A 2/1974 Lamel et al.
4,090,170 A * 5/1978 Lincklaen-Arriens et al. ... 340/854.8
4,254,481 A 3/1981 Smither et al.
4,293,936 A 10/1981 Cox et al.
4,293,937 A 10/1981 Sharp et al.
4,314,365 A 2/1982 Petersen et al.
4,597,067 A * 6/1986 Bockhorst et al. ............ 367/82
4,661,932 A * 4/1987 Howard et al. ............... 367/25
4,901,069 A * 2/1990 Veneruso .................... 340/853
4,903,245 A * 2/1990 Close et al. ................ 340/853
5,166,908 A * 11/1992 Montgomery ................ 367/82

FOREIGN PATENT DOCUMENTS

EP 033192 8/1981
GB 1096388 12/1967
GB 200619 B 3/1982
WO 89/10573 11/1989

* cited by examiner

*Primary Examiner*—Ian J. Lobo
(74) *Attorney, Agent, or Firm*—Drinker Biddle & Reath LLP

(57) ABSTRACT

Data is transmitted along a borehole containing a drill stem (2) by means of a transmitter (6) which converts electric data signals to acoustic signals propagating along the drill stem (2). The acoustic signals are converted back to electric form by a receiver (12) which also processes the signals. In the preferred form the signals are stored in a receiver memory (15) for subsequent retrieval using a pick-up tool (5) lowered into the borehole. The system is particularly useful in moving data past an obstruction such as a shut-in valve (4).

12 Claims, 3 Drawing Sheets

FIG.2
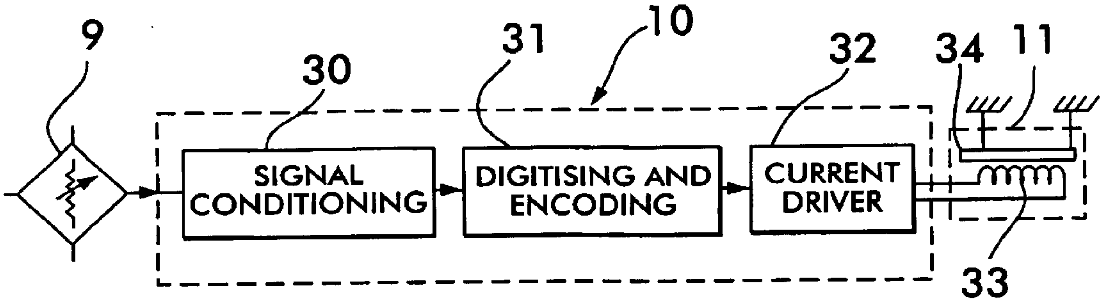
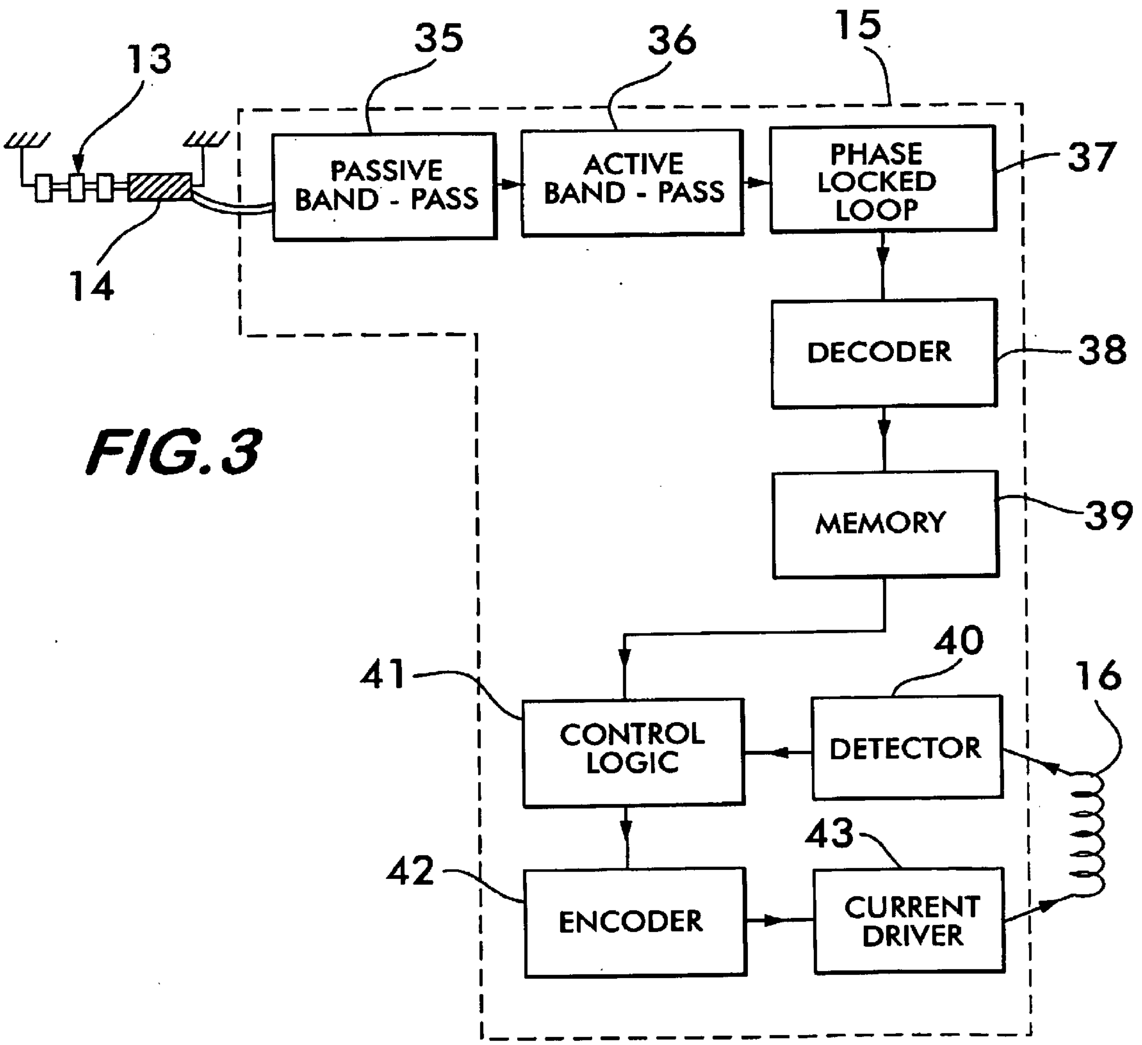
FIG.3

TRANSMISSION OF DATA IN BOREHOLES

This application is a continuation of prior application Ser. No. 08/813,104 filed on Mar. 7, 1997 now abandoned, which is a continuation of application Ser. No. 08/687,907 filed Jul. 30, 1996 now abandoned, which is a continuation of application Ser. No. 08/544,666 filed on Oct. 18, 1995 now abandoned, which is a continuation of application Ser. No. 08/030,309 filed May 7, 1993 now abandoned.

This invention relates to a method of and apparatus for transmitting date in boreholes such an oil wells.

To optimise the efficiency both of the detection of oil reserves and the recovery of these reserves, it is important to obtain as much detailed information as possible about the ambient environmental conditions at the bass of an oil well. This information is obtained by a variety of sensors located at the base of a well when required. The information obtained by the sensors may be transmitted to the surface of an open well using sonic waves which propagate through the drilling mud.

However, this method may only be employed during drilling when sufficient hydraulic power is available to generate the signal at the base of the well. During well testing and production this power source is not available and a valve or plug may be inserted in the well resulting in there being no direct fluid path through the centre of the well from the base of the well to the surface.

One situation to which this particularly applies is in shut-in testing where a shut-in valve is included in the well. A test generally consists of flowing the well, thus drawing down the well pressure, and then suddenly stopping the flow by closing the shut-in valve. Information regarding the potential of the reservoir can be derived from examination of the ensuing pressure rite/time characteristic, requiring a pressure gauge beneath the valve. The shut-in is best done down-hole rather than at the surface, to avoid well-bore storage effects which are difficult to compensate for.

It is possible to adapt valves to produce a hydraulic or electrical path through the valve to enable the transmission of signals from a sensor below the valve to a receiver above the valve. The path through the valve terminates in a connector which is suitable for connection to the receiver, the receiver in turn being connected via a cable to the surface of the well. However, this system is extremely difficult to operate as the small connector on the surface of the valve is extremely difficult to contact with the receiver and a considerable length of time is taken to make a suitable connection.

Accordingly, the present invention provides a method of transmitting data in a borehole, the method comprising providing an electric signal representative of the data to be transmitted, converting said electric signal into a sonic signal, propagating said sonic signal along an elongate member, and processing the sonic signal for onward transmission.

The processing of the sonic signal may for example be at the surface, or it may be downhole by retransmission or it may be by electronic data storage for later pick-up.

In another aspect, the invention provides apparatus for transmitting data in a borehole, the apparatus comprising a transmitter and a receiver; the transmitter including means for converting data parameters into an electric signal and first transducer means responsive to said electric signal to generate an acoustic signal, the first transducer means being adapted for physical coupling to an elongate member extending along the borehole whereby the acoustic signal is propagated in said elongate member; the receiver comprising second transducer means adapted for physical coupling to said elongate member to produce an electrical output corresponding to said acoustic signal, and signal processing means connected to receive said output and operative to process the data into a condition for onward transmission.

An embodiment of the invention will now be described, by way of example only, with reference to the drawings, in which:

FIG. 2 is a block diagram of a transmitter forming part of FIG. 1;

FIG. 3 is a block diagram of a receiver forming part of FIG. 1; and

Figure 1:
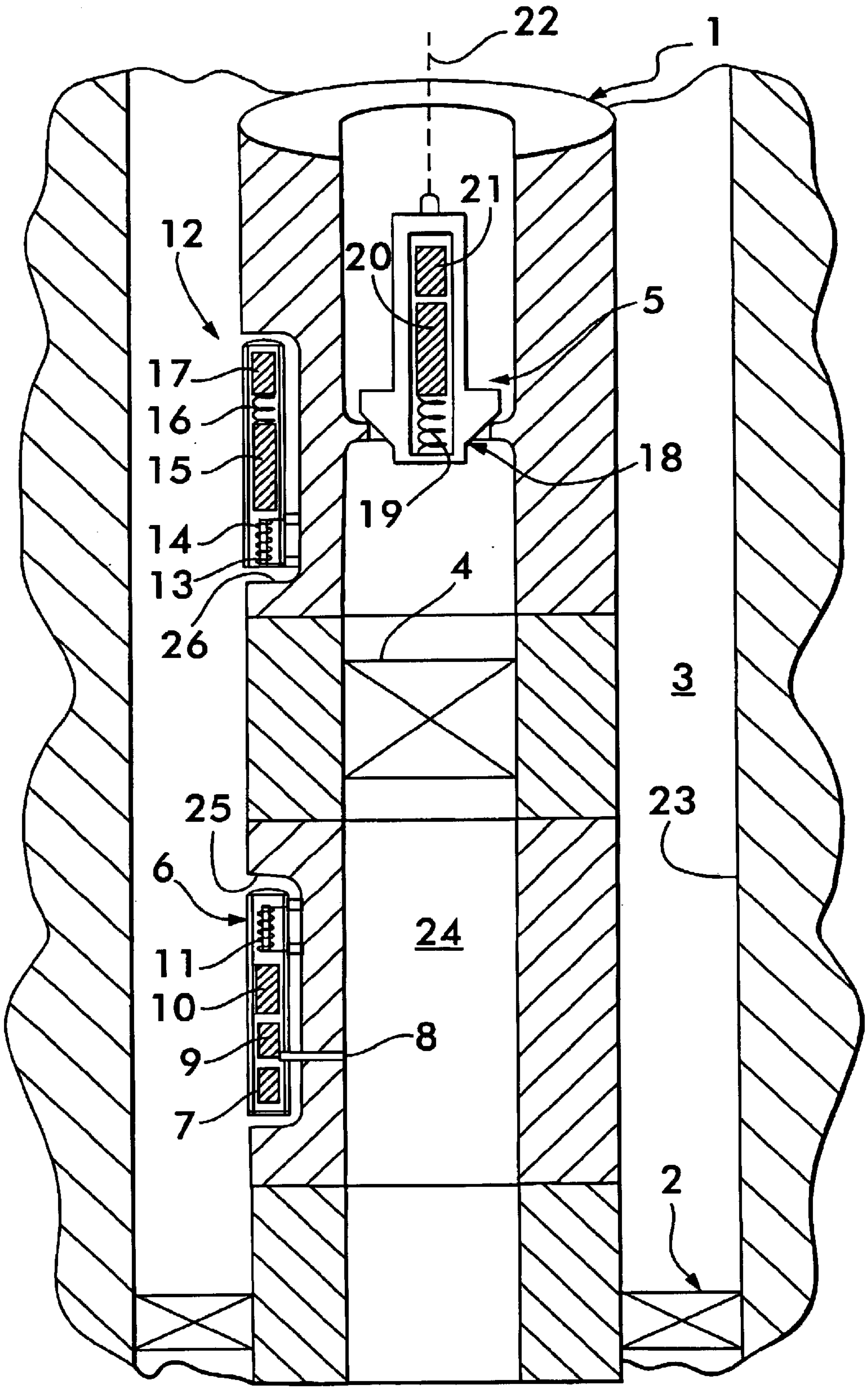
FIG. 1 is a schematic cross-sectional side view of apparatus in accordance with the invention in use in a well.

Referring to FIG. 1, a drill stem 1 in sealed to a well bore 23 by a packer 2, leaving an annulus 3 to contain mud and well control fluid. Any production fluids will pass up the centre of the drill stem 1 via a shut-in valve 4. The present embodiment utilizes the invention to pass data relating to the fluid pressure in the drill stem bore 24 below the shut-in valve 4 to a location above it.

A transmitter designated generally at 6 is positioned in an external recess 25 of the drill stem 1. The transmitter 6 is powered by a battery 7 and includes a pressure transducer 9 communicating with a lower bore 24 via a port 8. The analog pressure signal generated by the transducer 9 passes to an electronics module 10 in which it is digitized and serially encoded for transmission by a carrier frequency, suitably of 2–10 kHz. The resulting bursts of carrier are applied to a magnetostrictive transducer 11 comprising a coil formed around a core whose ends are rigidly fixed to the drill stem 1 at axially spaced locations. The digitally coded data is thus transformed into a longitudinal sonic wave in the drill stem 1.

A receiver generally designated at 12 is housed in an external recess 2 of the drill stem 1 at a location above the shut-in valve 4. The receiver 12 comprises a filter 13 and transducer 14 connected to an electronics module 15 powered by a battery 17.

The output of the electronics module 15 drives a signal coil 16.

The filter 13 is a mechanical band-pass filter tuned to the data carrier frequency, and serves to remove some of the acoustic noise in the drill stem 1 which could otherwise swamp the electronics. The transducer 14 is a piezoelectric element. The filter 13 and transducer 14 are mechanically coupled in series, and the combination is rigidly mounted at its ends to the drill stem 1, aligned with the longitudinal axis of the latter. Thus, the transducer 14 provides an electrical output representative of the sonic data signal.

A preferred method of retrieving the data is to store it in memory in the electronics module 15, for retrieval at a convenient time by a pick-up tool 5. This avoids the problems inherent in providing a real-time data path along the whole length of the well. The pick-up tool 5 is lowered on a cable or wireline 22 to locate in a nipple 18 which causes the signal in the receiver 16 to be aligned with a coil 19 in the pick-up tool 3. The coils 16 and 19 are then inductively coupled, allowing the data to be transferred to the pick-up tool 5 serially on a suitable carrier wave to the pick-up tool 5.

The pick-up tool 5 includes an electronics package 20 which is arranged to send a transmit command to the receiver 12 when the tool 5 is seated on the nipple 18. The electronics package 20 may be arranged to decode and store the data if the tool is on wireline, or to re-transmit the data if the tool is on cable. In the latter case, power may be supplied to the tool via the cable; otherwise, power is derived from an internal battery 21.

Referring now to FIG. 2, the transmitter electronics module 10 in the present embodiment comprises a signal conditioning circuit 30, a digitizing and encoding circuit 31, and a current driver 32. The details of these circuits do not form part of the present invention, and suitable circuitry will be readily apparent to those skilled in the art. The transducer 11 has a coil 33 connected to the current driver 32 and formed round a core schematically indicated at 34, suitably, the core is a laminated rod of nickel of about 25 mm diameter. The length of the rod is chosen to suit the desired sonic frequency which is suitably in the range 100 Hz to 10 kHz, preferably 2–6 kHz.

In the receiver, an seen in FIG. 3, the electronics module 15 comprises in series as passive band-pass filter 35, an active band-pass filter 36, and a phase-locked loop 37 supplying clean data signals to a decoder 38. The decoded data is stored in memory 39. When a pick-up tool 5 is positioned and activated, carrier frequency induced in the signal coil 16 in detected at 40 to enable control logic 41 to read data from memory 39 for transmission via encoder 42, current driver 43, and the signal coil 16.

Figure 4:
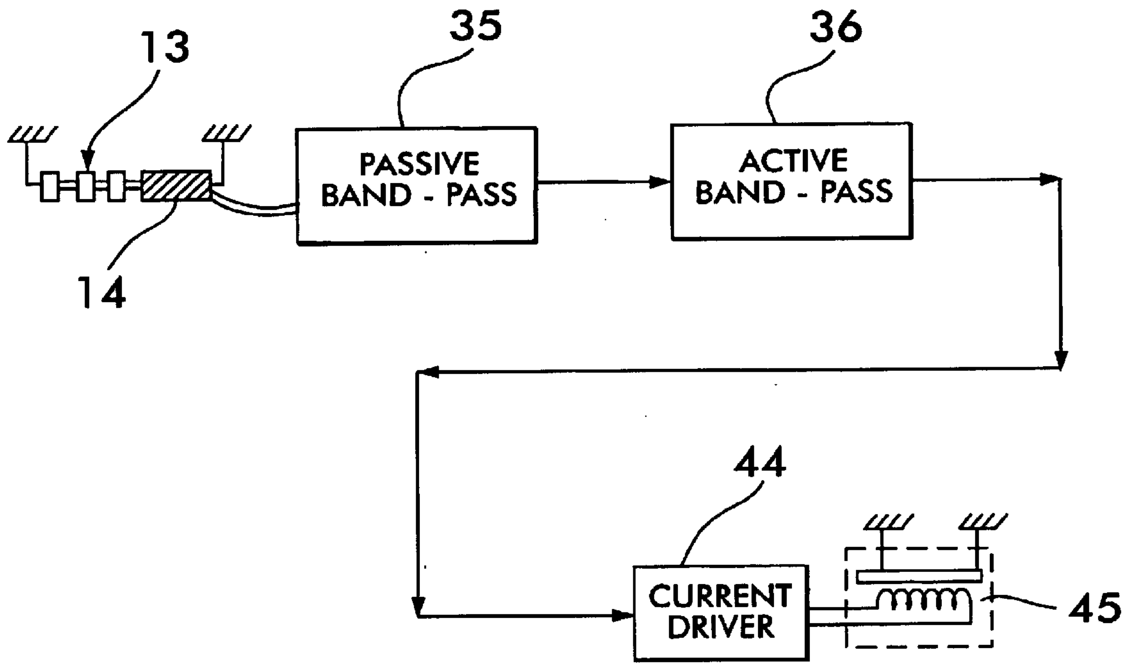
FIG. 4 is a block diagram of an alternative form of receiver.

The alternative receiver shown in FIG. 4 uses a similar mechanical filter 13, transducer 14, and electronic filter 35 and 36. In this case, however, the filtered date signal is not stored but is used to contact a current driver 44 driving a magnetostrictive transducer 45 for sonic re-transmission further along the drill stem.

Thus, the invention enables data to be transferred by sonic transmission past a valve or the like and then further handled by (a) storage in memory for later retrieval, (b) real-time transmission electrically by cable, or (c) sonic re-transmission.

Modifications way be made within the scope of the invention. For example, the transmitter transducer may impart a torsional, rather than a longitudinal, sonic vibration to the drill stem. Transducers of other than magnetostrictive type may be used, such as piezoelectric crystals or polymers.

Although described with particular reference to shut-in testing in producing wells, the invention may be applied to any situation where a borehole is obstructed. The medium for sonic transmission need not be a drill stem but could, for instance, be casing or other tubular.

What is claimed is:

1. A method of transmitting data in a borehole, the method comprising providing a first electric signal representative of the data to be transmitted, converting said first electric signal into a sonic signal at a first location closely adjacent one side of a physical obstruction in an internal bore of an elongate tubular member and propagating said sonic signal along said elongate tubular member from said first location to a second location closely adjacent a second side of said physical obstruction, wherein a distance between said first and second locations is short in comparison with a distance between said second location and a surface end of the borehole, converting said sonic signal into a second electric signal at said second location and storing said second electric signal for subsequent retrieval.

2. A method according to claim 1, in which the subsequent retrieval is effected by a pick-up tool lowered down the borehole to a location adjacent the obstruction.

3. A method according to claim 1, in which conversion from the electric signal to the sonic signal includes digital modulation of a carrier frequency in the range 100 Hz to 10 kHz.

4. A method according to claim 1, in which the sonic transmission is effected by longitudinal vibration.

5. A method according to claim 1, in which the elongate member is a drill stem, the obstruction is a shut-in valve in the drill stem, and the data comprises pressure-versus-time in the drill stem beneath the shut-in valve.

6. Apparatus for transmitting data in a borehole, the apparatus comprising a transmitter and a receiver; the transmitter including means for converting data parameters into an electric signal and first transducer means responsive to said electric signal to generate an acoustic signal, the first transducer means being adapted for physical coupling to an elongate tubular member having an internal bore extending along the borehole whereby the acoustic signal is propagated in said elongate tubular member; the receiver comprising second transducer means adapted for physical coupling to said elongate tubular member to produce an electrical output corresponding to said acoustic signal, and signal processing means connected to receive said output and operative to process the data into a condition for onward transmission; characterised in that said signal processing means includes memory means for storing received data, and means for transferring data from the memory means to a pick-up tool lowered to an adjacent location in the borehole; and in that the apparatus is adapted for use in transmitting data from one side to the other of an obstruction blocking said internal bore of said elongate tubular member, the first transducer means being coupled, in use, to said tubular member at a first location closely adjacent said obstruction on said one side and the second transducer means being coupled, in use, to the elongate tubular member at a second location closely adjacent said obstruction on said other side.

7. Apparatus according to claim 6, in which the first transducer means is a magnetrostrictive transducer adapted to be mounted to the elongate member to produce longitudinal sonic vibrations in it.

8. Apparatus according to claim 6, in which the data parameter converting means is a fluid pressure transducer for monitoring fluid pressure below said obstruction.

9. Apparatus according to claim 6, in which said second transducer means comprises a mechanical bandpass filter and a piezoactive element mounted in series on the elongate member.

10. Apparatus according to claim 6, in which the signal processing means includes electronic filter means.

11. Apparatus according to claim 6, in which the pick-up tool includes further memory means in which the data may be stored until the pick-up tool is returned to the surface.

12. Apparatus according to claim 6, in which the pick-up tool includes means for transmitting the data to the surface via a cable.

* * * * *